US012691939B2

(12) United States Patent　　(10) Patent No.:　US 12,691,939 B2
Manji　　(45) Date of Patent:　　　Jul. 28, 2026

(54) WORK VEHICLE

(71) Applicant: Kubota Corporation, Osaka (JP)

(72) Inventor: Yasuhiro Manji, Sakai (JP)

(73) Assignee: Kubota Corporation, Osaka (JP)

( * ) Notice:　Subject to any disclaimer, the term of this patent is extended or adjusted under 35 U.S.C. 154(b) by 398 days.

(21) Appl. No.: 18/373,593

(22) Filed:　Sep. 27, 2023

(65)　Prior Publication Data

US 2024/0101191 A1　　Mar. 28, 2024

(30)　Foreign Application Priority Data

Sep. 28, 2022　(JP) ................................. 2022-154866

(51) Int. Cl.
　　*B62D 11/08*　　(2006.01)
　　*A01D 34/64*　　(2006.01)
　　*A01D 101/00*　　(2006.01)
(52) U.S. Cl.
　　CPC .............. *B62D 11/08* (2013.01); *A01D 34/64* (2013.01); *A01D 2101/00* (2013.01)
(58) Field of Classification Search
　　CPC ..... B62D 11/08; A01D 34/64; A01D 2101/00
　　See application file for complete search history.

(56)　　　References Cited

U.S. PATENT DOCUMENTS

| | | | |
|---|---|---|---|
| 6,708,805 B2 | 3/2004 | Samejima et al. | |
| 10,974,597 B1 | 4/2021 | Manji | |
| 2008/0190084 A1* | 8/2008 | Piontek | B60T 11/21 |
| | | | 56/11.3 |
| 2021/0086831 A1* | 3/2021 | Ikeda | B60T 7/102 |
| 2021/0129668 A1* | 5/2021 | Manji | B62D 11/003 |

* cited by examiner

*Primary Examiner* — Jacob D Knutson
(74) *Attorney, Agent, or Firm* — The Webb Law Firm

(57)　　　ABSTRACT

A work vehicle includes a left operation tool that adjusts speed of a left rear wheel by displacement along a first path, a right operation tool that adjusts speed of a right rear wheel by displacement along a second path, a parking brake operating section that operates a parking brake in response to displacement of the left operation tool along a third path branching from the first path and displacement of the right operation tool along a fourth path branching from the second path, a parking brake release section that releases operation of the parking brake in response to release displacement of the left operation tool along the first path from a neutral position or release displacement of the right operation tool along the second path from a neutral position, a release displacement calculation section that calculates the release displacement, and a calibration section that calibrates the release displacement calculation section in real time.

6 Claims, 5 Drawing Sheets

WORK VEHICLE

CROSS-REFERENCE TO RELATED APPLICATION

This application claims priority to Japanese Patent Application No. 2022-154866 filed Sep. 28, 2022, the disclosure of which is hereby incorporated by reference in its entirety.

BACKGROUND OF THE INVENTION

1. Field of the Invention

The present invention relates to a work vehicle provided with a left operation tool for adjusting the speed of a left rear wheel, a right operation tool for adjusting the speed of a right rear wheel, and a parking brake.

2. Description of Related Art

Patent Document 1 (U.S. Pat. No. 6,708,805) discloses a ride-on mower provided with a left travel lever for adjusting the speed of a left rear wheel, a right travel lever for adjusting the speed of a right rear wheel, and a brake device. The brake device is linked to a brake lock mechanism that switches between a locked state in which the brake device is held in an engaged state and an unlocked state by operation of a brake lever or a brake pedal.

Patent Document 2 (U.S. Pat. No. 10,974,597) discloses a zero-turn mower including a pair of left and right control levers that can be independently operated to a forward speed position, a neutral position, a reverse speed position, and a parking position. The forward speed position, the neutral position and the reverse speed position are set on a front-back displacement path of the control lever. The control lever is further capable of lateral displacement orthogonal to the front-back direction from an intermediate position, and a terminal position of this lateral displacement is set as the parking position. If drive wheels are in a predetermined state when the control lever reaches the parking position, a parking brake operates.

With the work vehicle of Patent Document 1, the brake lever or brake pedal needs to be directly operated in order to operate and release the parking brake. Automatic operation of the parking brake such as operating or releasing the parking brake through operation of a different operation tool is not considered. With the work vehicle of Patent Document 2, the parking brake is automatically operated, by displacing the control lever to the parking position set on a branch path that branches from the neutral position of a shift displacement path. While not described in detail, the parking brake is released by disengaging the control lever from the parking position. If the work vehicle is parked in a place where the body becomes unstable when the parking brake is released due to the control lever disengaging from this parking position, the body could possibly start moving. Also, a problem inherent to detection sensors is that if there is a large variation in detection of disengagement of the control lever from the parking position, the tolerable range of disengagement detection must be increased, although this means that the release timing of the parking brake cannot be accurately obtained.

SUMMARY OF THE INVENTION

An object of the invention is to accurately obtain the release timing of a parking brake in a work vehicle in which operation and release of the parking brake is performed by an operation tool that performs a shift operation being operated and displaced.

A work vehicle according to the invention includes a front wheel unit, rear wheel unit including a left rear wheel and a right rear wheel, a variable travel power supply unit configured to supply rotary power independently to the left rear wheel and the right rear wheel, a left operation tool configured to adjust a speed of rotary power supplied from the variable travel power supply unit to the left rear wheel, by displacement along a first path which is a shift path, a right operation tool configured to adjust a speed of rotary power supplied from the variable travel power supply unit to the right rear wheel, by displacement along a second path which is a shift path, a parking brake provided in the variable travel power supply unit, a parking brake operating section configured to operate the parking brake, in response to (i) displacement of the left operation tool to a standby position of a third path branching from the first path and (ii) displacement of the right operation tool to a standby position of a fourth path branching from the second path, a parking brake release section configured to release operation of the parking brake, in response to at least one of (i) release displacement of the left operation tool along the first path from a neutral position (branch point JP) and (ii) release displacement of the right operation tool along the second path from a neutral position (branch point JP), while the parking brake is operating, a release displacement calculation section configured to calculate the release displacement, and a calibration section configured to calibrate the release displacement calculation section in real time.

According to this configuration, in response to at least one of release displacement of the left operation tool along the first path from the neutral position and release displacement of the right operation tool along the second path from the neutral position, the release displacement calculation section that calculates the release displacement is calibrated in real time by the calibration section. In other words, calculation of the release displacement, which is the basic value for releasing the parking brake, is calibrated each time the release displacement is calculated. The release displacement is always calculated based on a new calibration result (e.g., zero point adjustment) when an operator drives the parked work vehicle again, and thus the release timing of the parking brake is accurately obtained.

In the invention, the release displacement calculation section preferably calculates the release displacement from a detection value of a displacement detection sensor configured to detect displacement of the left operation tool and the right operation tool along the respective shift paths from the respective neutral positions, and the calibration section preferably performs the calibration, using, as a zero point, a disengagement detection value which is the detection value of the displacement detection sensor acquired when the left operation tool and the right operation tool disengage from the respective standby positions. With this configuration, the release displacement, which is displacement by a predetermined distance on the first path or the second path from the neutral position, is calculated using a detection value from the displacement detection sensor that detects displacement of the left or right operation tool on the first or second path. In order to accurately detect the release displacement, the detection value of the displacement detection sensor at the respective neutral positions (reference position) of the operation tools is preferably zero, but the detection value deviates from zero due to environmental conditions such as temperature and inherent errors of the detection sensor. In order to absorb this deviation, the value for determining the release displacement needs to be provided with a predetermined tolerance margin. Such a tolerance margin will reduce the detection accuracy of release displacement. However, with this configuration, zero point adjustment is performed with the disengagement detection value of the displacement detection sensor as the zero point, and thus high detection accuracy is obtained every time processing for releasing the parking brake is performed, without needing to provide the value for determining the release displacement with a tolerance margin.

Furthermore, in the invention, the work vehicle preferably further includes a limit switch configured to detect (i) that the left operation tool and the right operation tool have reached the respective standby positions, and (ii) that the left operation tool and the right operation tool have disengaged from the respective standby positions, and the calibration section preferably performs the calibration, using, as the zero point, the detection value of the displacement detection sensor acquired at a time that disengagement is detected by the limit switch or at a time of predetermined displacement after disengagement is detected. With this configuration, the limit switch detects that the operation tools have reached the respective standby positions, and detects that the operation tools have disengaged from the respective standby position. Furthermore, the detection value of the displacement detection sensor acquired at the time that disengagement of the operation tools from the respective standby positions is detected or at the time of predetermined displacement after disengagement is detected is used as the disengagement detection value in the release disengagement calculation section, and thus zero point adjustment by the calibration section is performed at a stable timing.

In the invention, displacement of the left operation tool along the third path and displacement of the right operation tool along the fourth path preferably expands a disembarkation passage for a driver to disembark from the work vehicle. With this configuration, the disembarkation passage for the driver to disembark from the work vehicle is expanded, due to displacement of the left operation tool along the third path and the displacement of the right operation tool along the fourth path, and the driver is able to smoothly disembark from the work vehicle. The parking brake operates, due to displacement of the left operation tool along the third path and displacement of the right operation tool along the fourth path that the driver inevitably performs in order to disembark from the work vehicle, and thus the driver forgetting to apply the parking brake when he or she disembarks from the work vehicle is avoided. The parking brake being released after the driver has disembarked from the work vehicle is also avoided.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

Hereinafter, embodiments serving as examples of the invention will be described based on the drawings. Note that, in the following description, with regard to a travel body of a ride-on mower (example of "work vehicle"), arrows F and B in FIGS. 1 and 2 respectively indicate a "forward direction" and a "rearward direction" of the body, arrows U and D in FIG. 1 respectively indicate an "upward direction" and a "downward direction" of the body, and arrows L and R in FIG. 2 respectively indicate a "leftward direction" and a "rightward direction" of the body.

Figure 1:
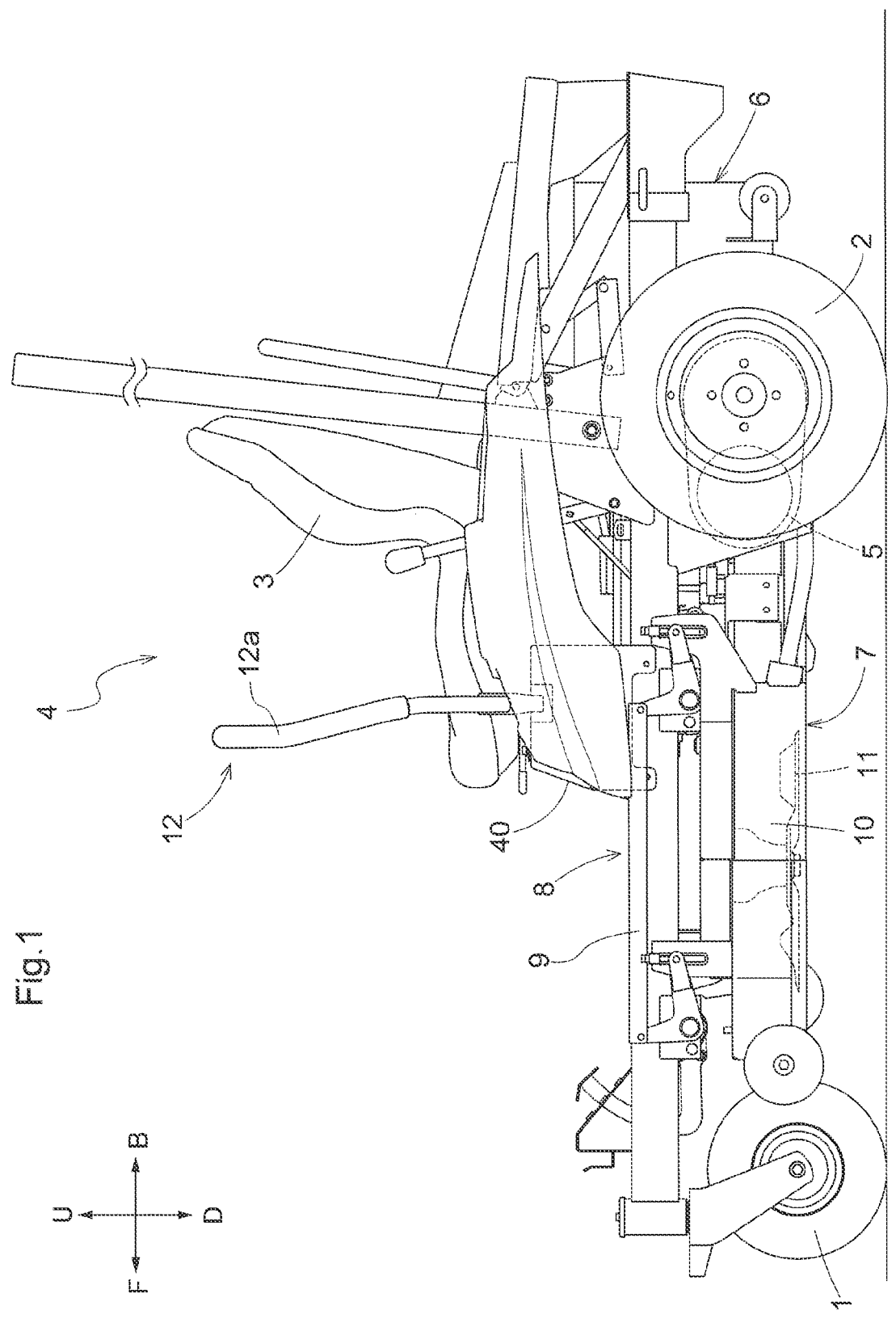
FIG. 1 is a left side view showing the entirety of a ride-on mower.
Figure 2:
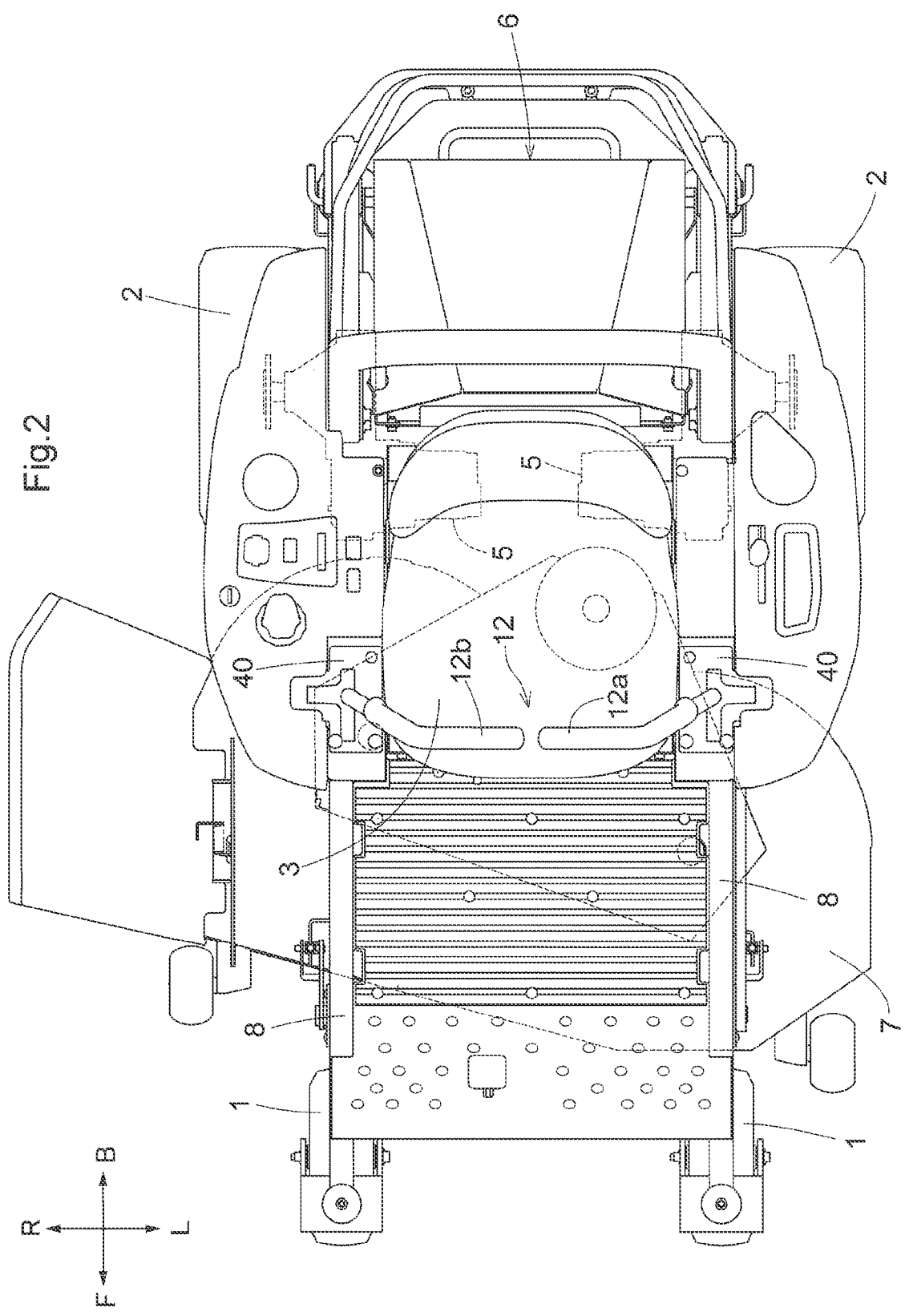
FIG. 2 is a plan view showing the entirety of the ride-on mower.

This ride-on mower is also referred to as a zero-turn mower, and, as shown in FIGS. 1 and 2, the travel body thereof is equipped with a front wheel unit 1 having a pair of left and right front wheels in such a manner as to be freely rotatable, and a rear wheel unit 2 having a left rear wheel and a right rear wheel in such a manner as to be drivable. The travel body has a body frame 8. The front wheels are caster type wheels. In a front section of the travel body is formed a driving section 4 having a driver's seat 3. Downward of the driving section 4 is provided a travel motor unit 5 constituted by a left motor and a right motor that independently supply rotary power to the left rear wheel and the right rear wheel. In a rear section of the travel body is provided a battery pack 6 that supplies power to the travel motor unit 5. Between the front wheel unit 1 and the rear wheel unit 2 is provided a mowing device 7. The mowing device 7 is supported by the body frame 8 via a link mechanism 9 that raises and lowers the mowing device 7 with respect to the travel body. The mowing device 7 includes a cutting blade housing 10 and a cutting blade 11 provided inside the cutting blade housing 10 in such a manner as to be rotationally driven about a support shaft (not shown) that extends in the up-down direction of the body as the rotation center.

As shown in FIGS. 1 and 2, the driving section 4 is provided with an operation lever unit 12 serving as a control for adjusting the speed and direction of the travel body. The operation lever unit 12 includes a left operation lever 12a (example of left operation tool) and a right operation lever 12b (example of right operation tool) that are respectively provided on left and right sides of the driver's seat 3. The driver gets into the driver's seat 3 by stepping up onto a floor plate provided in front of the driver's seat 3 and passing between the left operation lever 12a and the right operation lever 12b, and gets out of the driver's seat 3 by passing between the left operation lever 12a and the right operation lever 12b and stepping down onto the floor plate.

Figure 3:
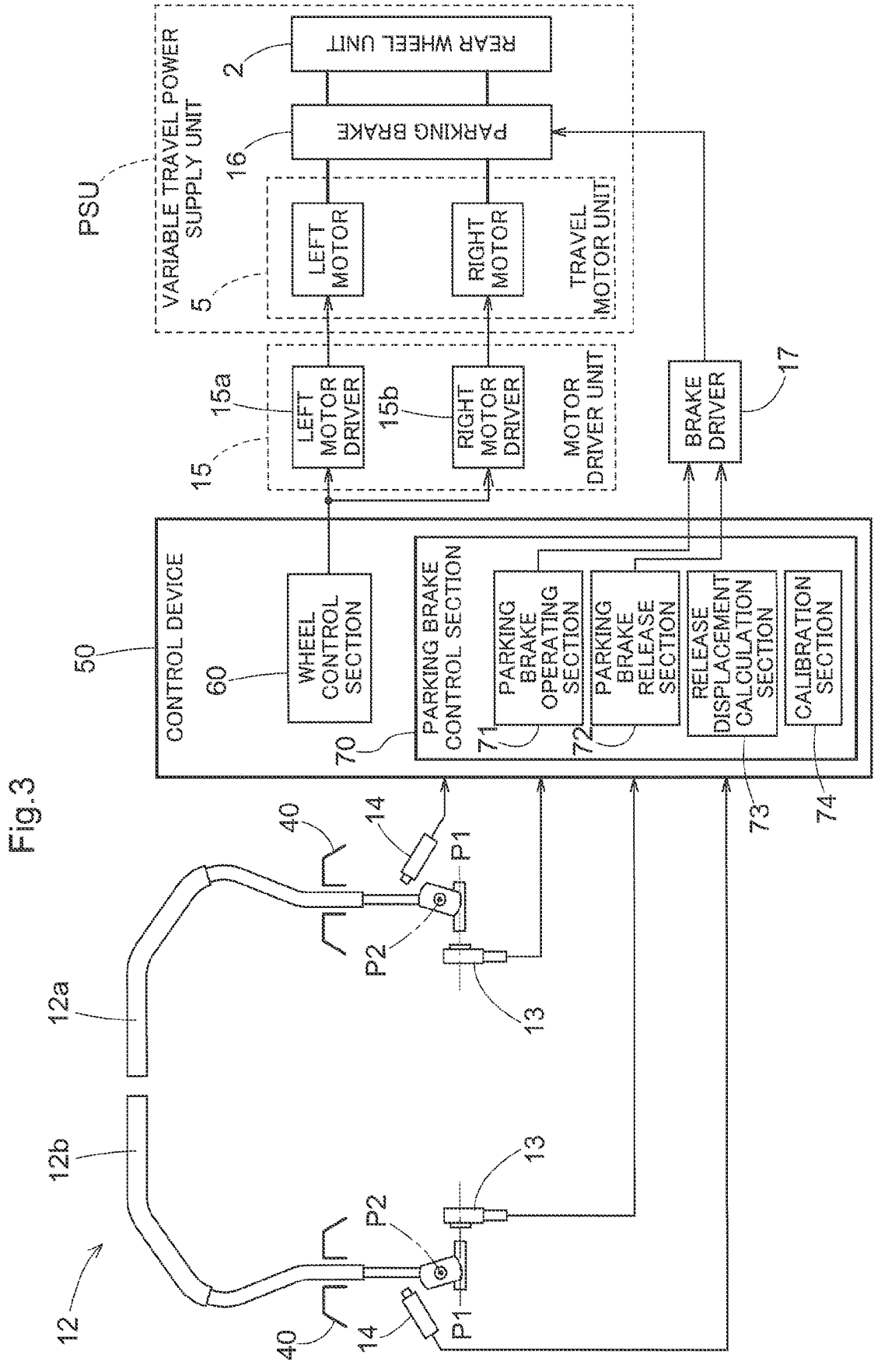
FIG. 3 is a functional block diagram of a control system relating to an operation lever unit.

As shown in FIG. 3, swing displacement of the left operation lever 12a and the right operation lever 12b occurs about respective first swing axes P1. This swing displacement is displacement in the front-back direction of the body and will be referred to as longitudinal displacement. Furthermore, swing displacement of the left operation lever 12a and the right operation lever 12b also occurs about respective second swing axes P2. This swing displacement is displacement in the transverse direction of the body and will be referred to as lateral displacement.

Figure 4:
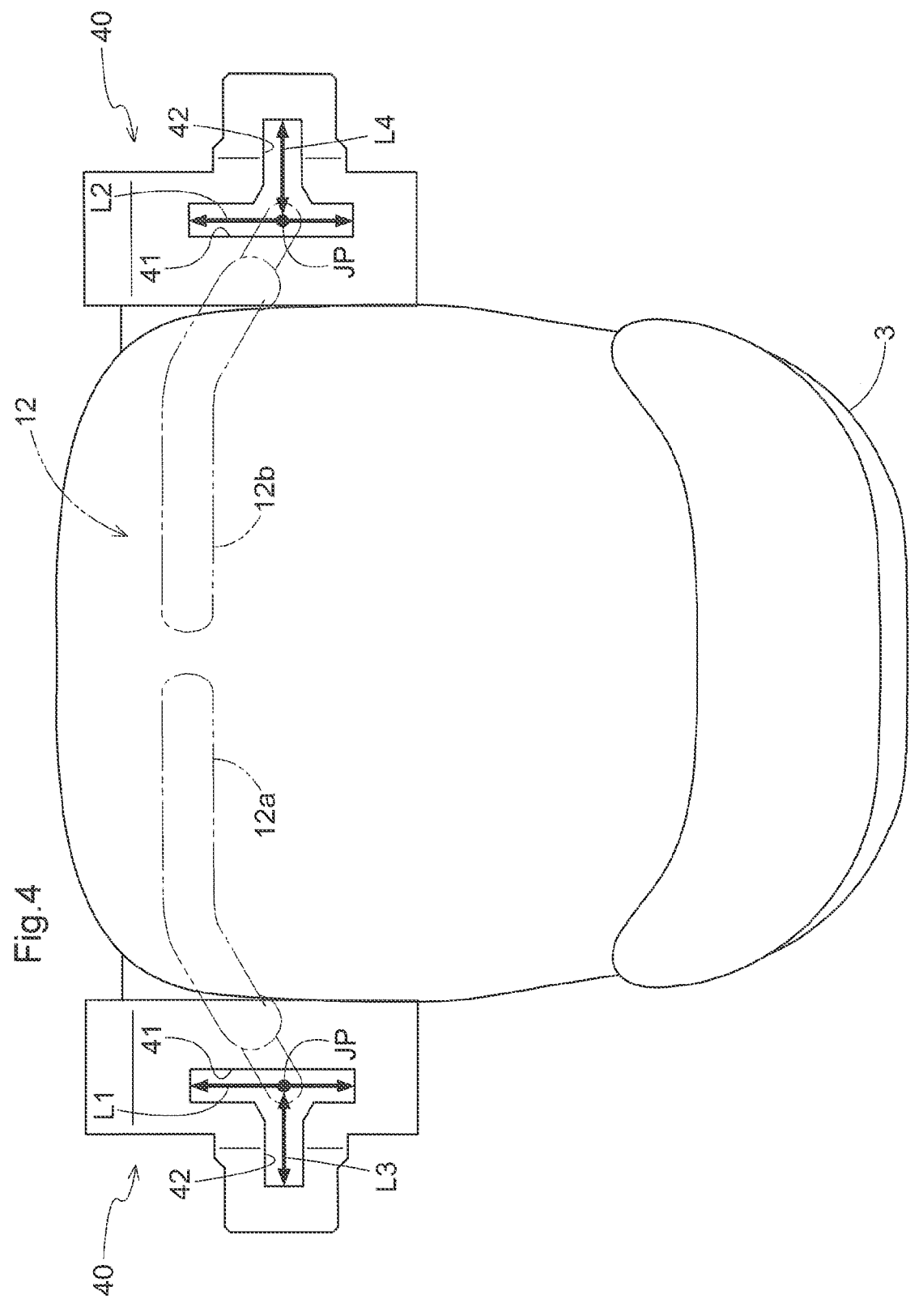
FIG. 4 is a plan view of guide units that guide operation levers.

As shown in FIGS. 3 and 4, the driving section 4 includes guide units 40 that guide base end portions of the left operation lever 12a and the right operation lever 12b, in order for the operation lever unit 12 to be displaced (swing) stably. Each guide unit 40 is a plate structure, and in an upper surface thereof is formed a longitudinal guiding slot 41 that guides longitudinal displacement of the left operation lever 12a or the right operation lever 12b and a lateral guiding slot 42 that guides lateral displacement of the left operation lever 12a or the right operation lever 12b. The longitudinal guide slot 41 connects to the lateral guiding slot 42 at a central portion of the longitudinal guide slot 41.

As shown in FIG. 4, the shift path (displacement path) of the left operation lever 12a that is guided by the longitudinal guiding slot 41 and displaced longitudinally will be referred to as a first path L1, and the shift path (displacement path) of the right operation lever 12b that is guided by the longitudinal guiding slot 41 and displaced longitudinally will be referred to as a second path L2. The displacement path of the left operation lever 12a that is guided by the lateral guiding slot 42 and displaced laterally will be referred to as a third path L3, and the displacement path of the right operation lever 12b that is guided by the lateral guiding slot 42 and displaced laterally will be referred to as a fourth path L4. The first path L1 and the third path L3 are connected at a branch point JP, and the second path L2 and the fourth path L4 are connected at a branch point JP. The first path L1 and the third path L3 are substantially orthogonal at the branch point JP, and the second path L2 and the fourth path L4 are substantially orthogonal at the branch point JP.

As shown in FIG. 3, near the base end of the left operation lever 12a is provided a potentiometer 13 serving as a longitudinal displacement detection sensor that detects longitudinal displacement of the left operation lever 12a along the first path L1. Similarly, near the base end of the right operation lever 12b is provided a potentiometer 13 serving as a longitudinal displacement detection sensor that detects longitudinal displacement of the right operation lever 12b along the second path L2. The potentiometers 13 are both connected to a control device 50. Note that part of the longitudinal displacement of the left operation lever 12a and the right operation lever 12b from the respective branch points JP while the parking brake 16 is operating is used as release displacement for releasing operation of the parking brake 16.

Furthermore, near the base end of the left operation lever 12a is provided a limit switch 14 that detects that the left operation lever 12a is located at a specific position (first detection position) set on the third path L3. Similarly, near the base end of the right operation lever 12b is provided a limit switch 14 that detects that the right operation lever 12b is located at a specific position (second detection position) set on the fourth path L4. The limit switches 14 are both connected to the control device 50.

The travel motor unit 5 that supplies rotary power to the rear wheel unit 2 is connected to the control device 50 via a motor driver unit 15. The travel motor unit 5 includes a left motor that supplies rotary power to the left rear wheel and a right motor that supplies rotary power to the right rear wheel. The motor driver unit 15 includes a left motor driver 15a for the left motor and a right motor driver 15b for the right motor. The control device 50 transmits a control signal generated by a wheel control section 60 provided in the control device 50 to the motor driver unit 15. The control device 50 performs rotation control of the travel motor unit 5, based on the longitudinal displacement of the operation lever unit 12. Specifically, the forward rotation speed of the left rear wheel increases as the left operation lever 12a is displaced forward from the branch point JP on the first path L1, and the reverse rotation speed of the left rear wheel increases as the left operation lever 12a is displaced rearward from the branch point JP on the first path L1. Similarly, the forward rotation speed of the right rear wheel increases as the right operation lever 12b is displaced forward from the branch point JP on the second path L2, and the reverse rotation speed of the right rear wheel increases as the right operation lever 12b is displaced rearward from the branch point JP on the second path L2. The position of the branch point JP of the left operation lever 12a and the position of the branch point JP of the right operation lever 12b are neutral positions, and power supply is not performed in the neutral state of these positions.

The branch points JP function as neutral positions for zeroing transmission of rotary power to the rear wheel unit 2, and thus while the left operation lever 12a is located on the third path L3, the transmission of rotary power to the left rear wheel will be zero, and the neutral state is maintained. Similarly, while the right operation lever 12b is located on the fourth path L4, the transmission of rotary power to the right rear wheel will be zero, and the neutral state is maintained.

As shown in FIG. 3, between the travel motor unit 5 and the rear wheel unit 2 is interposed a parking brake 16. The parking brake 16 includes a left brake between the left motor and the left rear wheel and a right brake between the right motor and the right rear wheel. The parking brake 16 and the control device 50 are connected via a brake driver 17. The control device 50 transmits a control signal generated by a parking brake control section 70 provided in the control device 50 to the brake driver 17. In this embodiment, the parking brake 16 is constituted by an electromagnetic brake.

In this embodiment, the travel motor unit 5, the parking brake 16 and a transmission mechanism (not shown) constitute a rotary power variable travel power supply unit PSU that supplies rotary power to the rear wheel unit 2 based on the displacement position of the operation lever unit 12. The transmission mechanism includes a transmission shaft, transmission gears and the like.

The parking brake control section 70 includes a parking brake operating section 71, a parking brake release section 72, a release displacement calculation section 73, and a calibration section 74. When the limit switch 14 on the left side has turned ON upon the left operation lever 12a of the operation lever unit 12 reaching the first detection position (parking brake operation position) which is the standby position, and the limit switch 14 on the right side has turned ON upon the right operation lever 12b reaching the second detection position (parking brake operation position) which is the standby position, the parking brake control section 70 operates the left and right brakes of the parking brake 16 (brake ON). The travel body is thereby changed to a parked state in which the parking brake 16 is operating (parking brake operating state).

As shown in FIG. 2, the left operation lever 12a of the operation lever unit 12 extends upward from the left side of the driver's seat 3 and bends toward the body centerline in the transverse direction of the body, and the bent portion is formed into a grip at a distal end region thereof. Similarly, the right operation lever 12b of the operation lever unit 12 extends upward from the right side of the driver's seat 3 and bends toward the body centerline in the transverse direction of the body, and the bent portion is formed into a grip at a distal end region thereof. In other words, the grip of the left operation lever 12a and the grip of the right operation lever 12b face each other and obstruct the disembarkation passage via which the driver gets out of the driver's seat 3. The distance between the grip of the left operation lever 12a and the grip of the right operation lever 12b increases, due to the left operation lever 12a being displaced along the third path L3 and the right operation lever 12b being displaced along the fourth path L4. In particular, the disembarkation passage for the driver to disembark is not obstructed when the left operation lever 12a and the right operation lever 12b are displaced to positions where the respective limit switches 14 are turned ON. When the driver disembarks, the left operation lever 12a is displaced along the third path L3, and the right operation lever 12b is displaced along the fourth path L4, at which point the parking brake 16 operates.

The parking brake release section 72 releases operation of the parking brake 16, in response to the left operation lever 12a or the right operation lever 12b disengaging from the parking brake operation position and reaching the branch point JP, and, furthermore, to at least one of release displacement of the left operation lever 12a along the first path L1 from the neutral position and release displacement of the right operation lever 12b along the second path L2 from the neutral position. The release displacement calculation section 73 calculates the release displacement which is the displacement of the left operation lever 12a and the right operation lever 12b from the respective branch points JP, based on the detection values of the respective potentiometers 13. The calibration section 74 calibrates the release displacement calculation section 73 in real time, using the detection values (disengagement detection values) of the potentiometers 13 acquired when the operation lever unit 12 disengages from the parking brake operation position.

An example of the control procedure for releasing operation of the parking brake 16 by the parking brake control section 70 is as follows.

1: A disengagement detection signal from the limit switch 14 indicating that the left operation lever 12a of the operation lever unit 12 has disengaged from the first detection position (parking brake operation position) of the third path L3, or that the right operation lever 12b has disengaged from the second detection position (parking brake operation position) of the fourth path L4 is given to the parking brake control section 70.

2: The calibration section 74 records, as disengagement detection values, the detection values of the potentiometers 13 that detect the longitudinal displacement of the operation lever unit 12 (left operation lever 12a and right operation lever 12b), in response to receiving the disengagement detection signal.

3: Furthermore, the calibration section 74 calibrates (zero point calibration) a release displacement calculation program of the release displacement calculation section 73, using the disengagement detection values as reference values (zero points).

4: The release displacement calculation section 73 calculates the release displacement, using the calibrated release displacement calculation program (i.e., program that takes the difference of the reference value (disengagement detection value) and the detection value of each potentiometer 13 as the release displacement).

5: When the calculated release displacement reaches a preset release displacement value, the parking brake release section 72 sends a release command to the brake driver 17 to release operation of the parking brake 16. The release displacement value may be adjustable or fixed. At that time, the release displacement value is preferably a value at which a small amount of rotary power is supplied to the rear wheel unit 2 by the travel motor unit 5, in order to avoid slight movement of the body, due to operation of the parking brake 16 being released.

Figure 5:
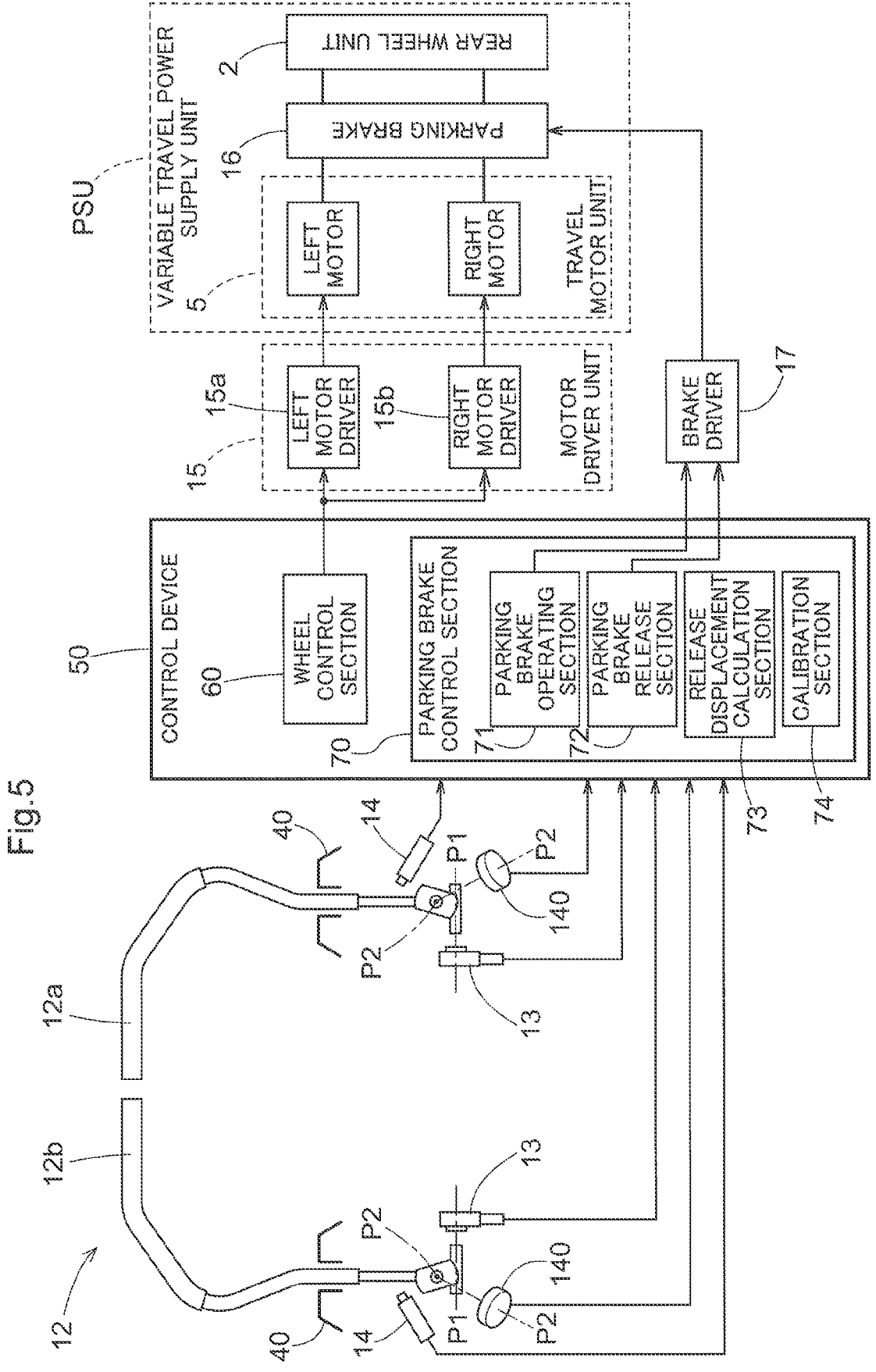
FIG. 5 is a functional block diagram of another embodiment.

Other Embodiments (1) In the control procedure for releasing operation of the parking brake 16 described above, the detection value of each potentiometer 13 acquired at the time that the operation lever unit 12 disengages from the parking brake operation position is recorded as the disengagement detection value. Alternatively, the detection value of each potentiometer 13 acquired at the time that the operation lever unit 12 is displaced laterally by a predetermined distance (distance to branch point JP being the maximum value) from the parking brake operation position may be recorded as the disengagement detection value. In order to realize this other embodiment, as shown in FIG. 5, near the base ends of the left operation lever 12a and the right operation lever 12b of the operation lever unit 12 are further provided lateral potentiometers 140 for detecting lateral displacement (displacement along third path L3 and fourth path L4) which is swing displacement about the respective second swing axes P2. These lateral potentiometers 140 are connected to the control device 50, and the parking brake control section 70 is able to successively detect lateral displacement of the left operation lever 12a and the right operation lever 12b. Accordingly, the parking brake control section 70 is able to release the parking brake 16, by detecting lateral displacement of the operation levers at a predetermined angle from the neutral position (branch point JP).

(2) In this variation of the other embodiment of (1) above, the detection value of each potentiometer 13 acquired at the time that lateral displacement of the operation lever unit 12 from the parking brake operation position exceeding a predetermined displacement rate is detected is recorded as the disengagement detection value. The displacement rate is calculated by a differential computation device of the parking brake control section 70 to which signals from the lateral potentiometers 140 are input, and the predetermined displacement rate is generally set based on how the driver operates the operation lever unit 12 when starting travel from the parked state.

(3) In the control procedure for releasing operation of the parking brake 16 described above, operation of the parking brake 16 is released when the calculated release displacement reaches a preset release displacement value. Alternatively, operation of the parking brake 16 may be released in response to at least one of displacement of the left operation lever 12a exceeding a predetermined displacement rate along the first path L1 from the neutral position (branch point JP) and displacement of the right operation lever 12b exceeding a predetermined displacement rate along the second path L2 from the neutral position. This displacement rate is calculated by a differential computation device of the parking brake control section 70 to which signals from the potentiometers 13 are input, and the predetermined displacement rate is generally set based on how the driver operates the operation lever unit 12 when starting travel from the parking state.

(4) In the above-described embodiment, an example is given in which the front wheel unit 1 and the rear wheel unit 2 are provided as a travel device and the travel motor unit 5 is provided as a drive device that drives the travel device, but the invention is not limited thereto. For example, the travel body may be provided with a crawler type travel device or a travel device that combines a mini crawler and wheels. Also, the work vehicle may be provided with a continuously variable transmission that drives the travel device by input of power from an engine being received and the input power being shifted and transmitted to the travel device.

(5) In the above-described embodiment, the parking brake 16 is constituted by an electromagnetic brake, but, alternatively, another brake structure may be employed, such as a mechanical brake operated by an electric actuator.

(6) In the above-described embodiment, operation levers that swing about a swing supporting point are adopted as operation tools, but other types of operation tools such as sliding type operation tools may be used.

(7) In the above-described embodiment, limit switch type and potentiometer type detection devices are used in detecting behavior on each path of the operation lever unit 12, but a detection device such as a magnetic detection device or an optical detection device may be used.

Industrial Applicability

The invention can be applied to various work vehicles such as transport vehicles in addition to mowers.

LIST OF REFERENCE SIGNS

1 Front wheel unit
2 Rear wheel unit
5 Travel motor unit
12 Operation lever unit
12*a* Left operation lever
12*b* Right operation lever
13 Potentiometer
14 Limit switch
16 Parking brake
17 Brake driver
50 Control section
60 Wheel control section
70 Parking brake control section
71 Parking brake operating section
72 Parking brake release section
73 Release displacement calculation section
74 Calibration section
L1 First path
L2 Second path
L3 Third path
L4 Fourth path

What is claimed is:

1. A work vehicle comprising:
a front wheel unit;
a rear wheel unit comprising a left rear wheel and a right rear wheel;
a variable travel power supply unit configured to supply rotary power independently to the left rear wheel and the right rear wheel;
a left operation tool configured to adjust a speed of rotary power supplied from the variable travel power supply unit to the left rear wheel, by displacement along a first path which is a shift path;
a right operation tool configured to adjust a speed of rotary power supplied from the variable travel power supply unit to the right rear wheel, by displacement along a second path which is a shift path;
a parking brake provided in the variable travel power supply unit;
a parking brake operating section configured to operate the parking brake, in response to (i) displacement of the left operation tool to a standby position of a third path branching from the first path and (ii) displacement of the right operation tool to a standby position of a fourth path branching from the second path;
a parking brake release section configured to release operation of the parking brake, in response to at least one of (i) release displacement of the left operation tool along the first path from a neutral position and (ii) release displacement of the right operation tool along the second path from a neutral position, while the parking brake is operating;
a release displacement calculation section configured to calculate the release displacement; and
a calibration section configured to calibrate the release displacement calculation section in real time.

2. The work vehicle according to claim 1,
wherein the release displacement calculation section calculates the release displacement from a detection value of a displacement detection sensor configured to detect displacement of the left operation tool and the right operation tool along the respective shift paths from the respective neutral positions, and
wherein the calibration section performs the calibration, using, as a zero point, a disengagement detection value which is the detection value of the displacement detection sensor acquired when the left operation tool and the right operation tool disengage from the respective standby positions.

3. The work vehicle according to claim 2, further comprising:
a limit switch configured to detect (i) that the left operation tool and the right operation tool have reached the respective standby positions, and (ii) that the left operation tool and the right operation tool have disengaged from the respective standby positions, and
wherein the calibration section performs the calibration, using, as the zero point, the detection value of the displacement detection sensor acquired at a time that disengagement is detected by the limit switch or at a time of predetermined displacement after disengagement is detected.

4. The work vehicle according to claim 1,
wherein displacement of the left operation tool along the third path and displacement of the right operation tool along the fourth path expands a disembarkation passage for a driver to disembark from the work vehicle.

5. The work vehicle according to claim 1,
wherein the parking brake release section releases operation of the parking brake in response to the release displacement after the left operation tool or the right operation tool disengages from the respective standby position and reaches the respective neutral position.

6. A work vehicle comprising:
a front wheel unit;
a rear wheel unit comprising a left rear wheel and a right rear wheel;
a variable travel power supply unit configured to supply rotary power independently to the left rear wheel and the right rear wheel;
a left operation tool configured to adjust a speed of rotary power supplied from the variable travel power supply unit to the left rear wheel, by displacement along a first path which is a shift path;
a right operation tool configured to adjust a speed of rotary power supplied from the variable travel power supply unit to the right rear wheel, by displacement along a second path which is a shift path;
a parking brake provided in the variable travel power supply unit;
a parking brake operating section configured to operate the parking brake, in response to (i) displacement of the left operation tool to a standby position of a third path branching from the first path and (ii) displacement of the right operation tool to a standby position of a fourth path branching from the second path;

a parking brake release section configured to release operation of the parking brake, in response to at least one of (i) release displacement of the left operation tool along the first path from a neutral position and (ii) release displacement of the right operation tool along the second path from a neutral position, while the parking brake is operating;

a release displacement calculation section configured to calculate the release displacement; and a calibration section configured to calibrate the release displacement calculation section in real time, wherein the release displacement calculation section calculates the release displacement from a detection value of a displacement detection sensor configured to detect displacement of the left operation tool and the right operation tool along the respective shift paths from the respective neutral positions, wherein the calibration section performs the calibration, using, as a zero point, a disengagement detection value which is the detection value of the displacement detection sensor acquired when the left operation tool and the right operation tool disengage from the respective standby positions, wherein the work vehicle further comprises a limit switch configured to detect 1 that the left operation tool and the right operation tool have reached the respective standby positions, and (ii) that the left operation tool and the right operation tool have disengaged from the respective standby positions, and wherein the calibration section performs the calibration, using, as the zero point, the detection value of the displacement detection sensor acquired at a time that disengagement is detected by the limit switch or at a time of predetermined displacement after disengagement is detected.

\* \* \* \* \*